US012365113B2

(12) United States Patent
Wegner et al.

(10) Patent No.: US 12,365,113 B2
(45) Date of Patent: Jul. 22, 2025

(54) FORM FOR VERTICALLY CASTING FLARED END PRODUCTS AND METHOD OF MANUFACTURING THE SAME

(71) Applicant: HAWKEYEPEDERSHAAB CONCRETE TECHNOLOGIES, INC., Clayton, MO (US)

(72) Inventors: James C. Wegner, New Hampton, IA (US); Brandon W. Bahlmann, Plainfield, IA (US)

(73) Assignee: HAWKEYEPEDERSHAAB CONCRETE TECHNOLOGIES, INC., St. Louis, MO (US)

( * ) Notice: Subject to any disclaimer, the term of this patent is extended or adjusted under 35 U.S.C. 154(b) by 142 days.

(21) Appl. No.: 18/492,429

(22) Filed: Oct. 23, 2023

(65) Prior Publication Data

US 2025/0073950 A1 Mar. 6, 2025

Related U.S. Application Data

(60) Provisional application No. 63/579,359, filed on Aug. 29, 2023.

(51) Int. Cl.
*B28B 7/20* (2006.01)
*B28B 7/18* (2006.01)

(52) U.S. Cl.
CPC . *B28B 7/20* (2013.01); *B28B 7/18* (2013.01)

(58) Field of Classification Search
None
See application file for complete search history.

(56) References Cited

U.S. PATENT DOCUMENTS 4,869,660 A 9/1989 Ruckstuhl
6,829,867 B2 12/2004 Gresser et al.
(Continued)

FOREIGN PATENT DOCUMENTS

JP 2006326944 A 12/2006
KR 100518281 B1 9/2005
KR 20140029206 A 3/2014

OTHER PUBLICATIONS

Dianna Starovoytova Madara, Saul Sitati Namango, Daniel Arusei; Innovative Conceptual Design of Manual-Concrete-Block Making Machine: Journal Name:Innovative Systems Design and Englineering; Publication Date: 2016.
(Continued)

*Primary Examiner* — Yung-Sheng M Tsui
(74) *Attorney, Agent, or Firm* — SHUTTLEWORTH & INGERSOLL, PLC; Jason R. Sytsma

(57) ABSTRACT

A base assembly with a pair of doors slidingly attached to the base assembly for moving between an open position and a closed position. An inner core comprising a first end and a throat end with the throat end having a larger diameter than the first end is positioned downward on top of the base assembly with the first end in an upright position. A pallet is positioned around the throat end of the inner core. When the pair of doors are in the closed position, a cavity is formed that is open from the top of the pair of doors and is located between the inner core and the pair of doors and corresponds to the shape of the concrete product with the flared end. The foregoing assembly allows for wet casting concrete products in a vertically upright position.

16 Claims, 10 Drawing Sheets

(56) References Cited

U.S. PATENT DOCUMENTS

| | | | | |
|---|---|---|---|---|
| 6,997,427 | B2 | 2/2006 | Manthei | |
| 7,156,645 | B2 | 1/2007 | Ness | |
| 7,341,685 | B2 | 3/2008 | Hamilton et al. | |
| 10,053,632 | B2 | 8/2018 | O'Neill et al. | |
| 10,661,474 | B2 | 5/2020 | Kloss et al. | |
| 2005/0109996 | A1 | 5/2005 | Razzaghi | |
| 2009/0016919 | A1 | 1/2009 | Mitchell | |
| 2012/0139163 | A1* | 6/2012 | Garfinkel | B28B 15/00<br>425/258 |
| 2013/0248680 | A1* | 9/2013 | Fergeson | B29C 33/301<br>249/11 |
| 2021/0001412 | A1 | 1/2021 | Burgess et al. | |
| 2022/0032502 | A1* | 2/2022 | Hume | B28B 7/364 |

OTHER PUBLICATIONS

Schrock, Nathan—U.S. Appl. No. 16/580,701, filed Sep. 24, 2019 and issued Apr. 18, 2023 as U.S. Pat. No. 11,628,594.
Schrock, Nathan—U.S. Appl. No. 18/181,499, filed Mar. 10, 2023.
Canadian Office Action dated Apr. 23, 2025 from Canadian Counterpart Application No. 3,222,758.

* cited by examiner

FORM FOR VERTICALLY CASTING FLARED END PRODUCTS AND METHOD OF MANUFACTURING THE SAME

CROSS-REFERENCE TO RELATED APPLICATIONS

The present application claims the benefit of U.S. Provisional Patent Application No. 63/579,359 filed Aug. 29, 2023, the contents of which is incorporated herein by reference.

TECHNICAL FIELD

This disclosure relates a form for producing concrete products in a vertical casting mold and, more specifically, this disclosure relates to a vertical oriented mold for wet casting concrete products with flared ends.

BACKGROUND INFORMATION

Concrete pipes and products with forms and methods of manufacturing the same have been around for many years. Such pipes are commonly used below ground for sewer and culvert applications. At the end of these pipes at the transition from underground to ground level, it is desirable to provide concrete products with flared ends to improve the flow capacity of the sewer or culvert and create an aesthetically pleasing transition into an embankment.

Concrete pipes and products are cast in forms in either a dry cast or wet cast method. Dry cast has a low water to cement ratio and no slump, so it dries quickly and is perfect for pipes, manholes and other various products. It is also faster to produce than wet cast, so it works well in applications where multiple products are being manufactured per day with heavy vibration to increase the speed of compaction. Wet cast, on the other hand, is an easily flowing form of concrete with a high water to concrete ratio. It is typically cast in forms, stripped, finished, and labelled before shipping. Larger, more intricate parts that require flow-ability in the concrete for the concrete to solidify around reinforcing and throughout the form are frequently cast wet. Because of the advantage of dry cast over wet cast, products with flared ends have always been either dry cast in vertical form sets or wet cast in horizontal form sets.

In the dry cast method, the flared end forms are filled, headed, and quickly jacket stripped with an overhead crane and allowed to cure with the flared end facing down. In the wet cast method, the forms are poured and allowed to cure horizontally before stripping the core from the concrete. Horizontal wet cast forms are complicated and require lots of equipment and time to strip. What is needed is a form for vertically casting flared end concrete products and a method of manufacturing the same.

SUMMARY

Disclosed herein is a vertical wet cast form assembly for manufacturing a concrete product with a flared end and a method of manufacturing the same. The form assembly can comprise a base assembly with a pair of doors slidingly attached to the base assembly for moving between an open position and a closed position. An inner core comprising a first end and a throat end with the throat end having a larger diameter than the first end is positioned downward on top of the base assembly with the first end in an upright position. A pallet is positioned around the throat end of the inner core. When the pair of doors are in the closed position, a cavity is formed that is open from the top of the pair of doors and is located between the inner core and the pair of doors and corresponds to the shape of the concrete product with the flared end. The foregoing assembly allows for wet casting concrete products in a vertically upright position.

In an embodiment, the pallet comprises of a flared-end former having two ends and a plate attached at to the two ends of the flared-end former. A plurality of reinforcing ribs can extend between the flared-end former with a reinforcing member extending upright between the plate and the flared-end former. The pallet can be provided in a variety of shapes depending on the desired shape of the flared end of the concrete product. In an embodiment, flared-end former can be bent around an axis to provide an open-end shape of the concrete product.

In an embodiment, an actuator attached at one end to the base and attached at another end to the pallet for pushing the pallet upward to break the bond between the inner core and the concrete product with the flared end.

A further embodiment discloses a method of vertical wet casting a concrete product with a flared end in an upright position. The method comprises of providing a base assembly, an inner core comprising a first end and a throat end with the throat end having a larger diameter than the first end and with the throat end positioned downward with the first end in an upright position, a pallet positioned around the throat end of the inner core, and a pair of doors slidingly attached to the base assembly for moving between an open position and a closed position.

When the manufacturing process is ready to begin the method continues with closing the pair of doors and positioning an end-former on the pair of doors when in the closed position. Thereafter, the method continues with filling a cavity with concrete slurry and allowing the concrete slurry to partially solidify.

Thereafter, the method can continue with removing the end-former and opening the pair of doors and pushing the pallet upward with respect to the inner core and breaking the bond between the inner core and the concrete product. Thereafter, the method continues with lifting the concrete product vertically upward with respect to the inner core and laying the concrete product on its side to finish curing. The assembly is now ready for manufacturing another concrete product.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
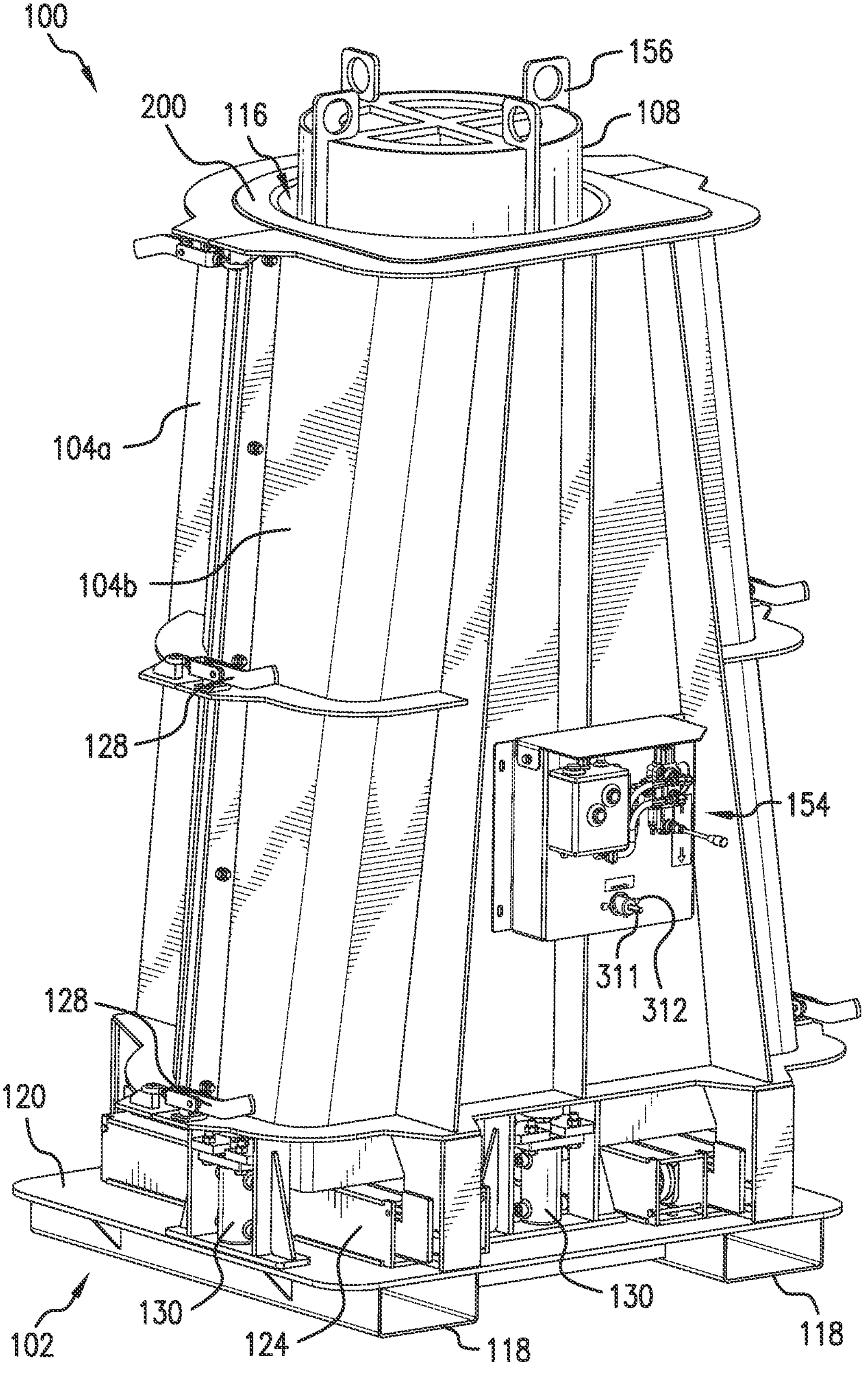
FIG. 1 illustrates a vertical wet cast form assembly for wet-cast manufacturing flared end products according to this disclosure.
Figure 2:
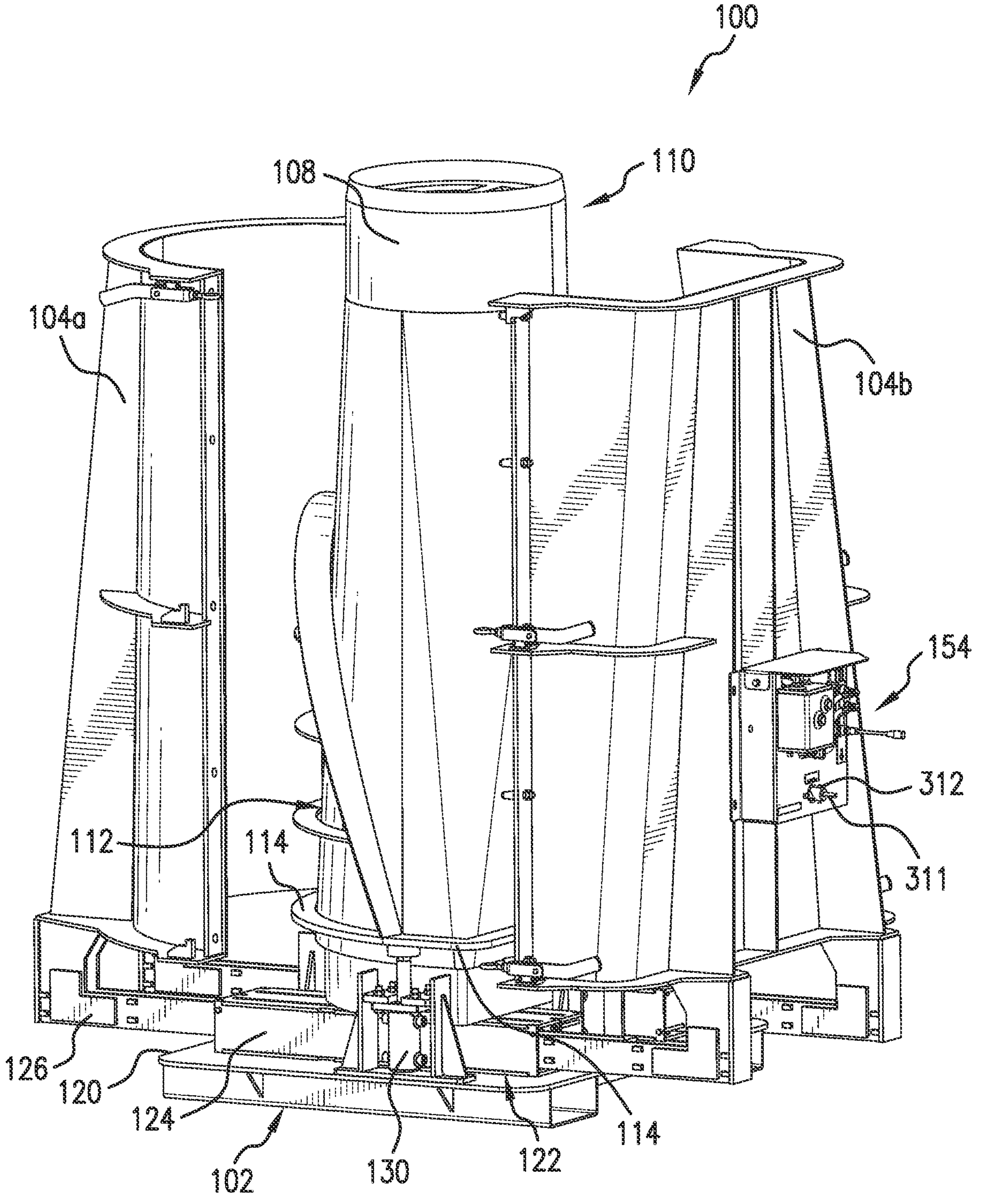
FIG. 2 illustrates the assembly of FIG. 1 with the doors rolled open.

FIGS. 1 and 2 illustrates a vertical wet cast form assembly 100 for wet-cast manufacturing flared-end products 200 (shown in FIG. 5) according to this disclosure. Assembly 100 comprises of a base assembly 102, a pair of doors 104*a* and 104*b*, referred to collectively as 104, that are slidingly attached to base assembly 102 for moving between an open position and a closed position. An inner core 108 comprising a first end 110 and a throat end 112 with throat end 112 having a larger diameter than first end 110 and with throat end 112 being positioned downward on top of base assembly 102. A pallet 114 is slidingly engaged on inner core 108 around throat end 112 of inner core 108. In this arrangement, when pair of doors 104 are in the closed position a cavity 116 is formed that is open from the top of pair of doors 104 (as shown in FIG. 1) and is between inner core 108 and pair of doors 104 with the interior of cavity 116 corresponding to the shape of flared end product 200.

More specifically, FIGS. 1 and 2 show pair of doors 104 slidingly engaged on base assembly 102 and moved between the closed position (FIG. 1) and the open position (FIG. 2). Base assembly 102 comprises a pair rectangular tubes 118 and that are sufficiently spaced apart to provide ground support for assembly 100 and allow for the tines of a fork lift to lift and move assembly 100 around to various locations as desired. A support plate 120 extends between rectangular tubes 118 to provide a structural platform for the remaining components of base assembly 102.

Pair of doors 104 are slidingly engaged to base assembly 102 a pair of telescoping tracks 122. Each of the pair of telescoping tracks 122 comprises an outer body 124 and an inner support 126 that telescopes in and out of outer body 124 by rolling along on v-grooved wheels engaged on a track inside outer body 124. Each of doors 104*a* and 104*b* of pair of doors 104 can open and close independent of each by simply pushing them open. Pair of doors 104 can also be held firmly locked in place by one or more locking bars 128 so that they are held firmly closed during the wet-casting process.

Strategically placed around base assembly 102 are actuators 130. Actuators 130 (as shown more clearly in FIG. 5A) are positioned on support plate 120 with their respective rods 132 free to engage pallet 114 and their respective bodies 134 bolted firmly in place on support plate 120 of base assembly 102. In this way actuator 130 are firmly attached to base assembly 102 so that rods 132 can press upward to break the bond between flared product 200 and inner core 108 so that flared product 200 can be removed and separated from assembly 100.

Figure 6:
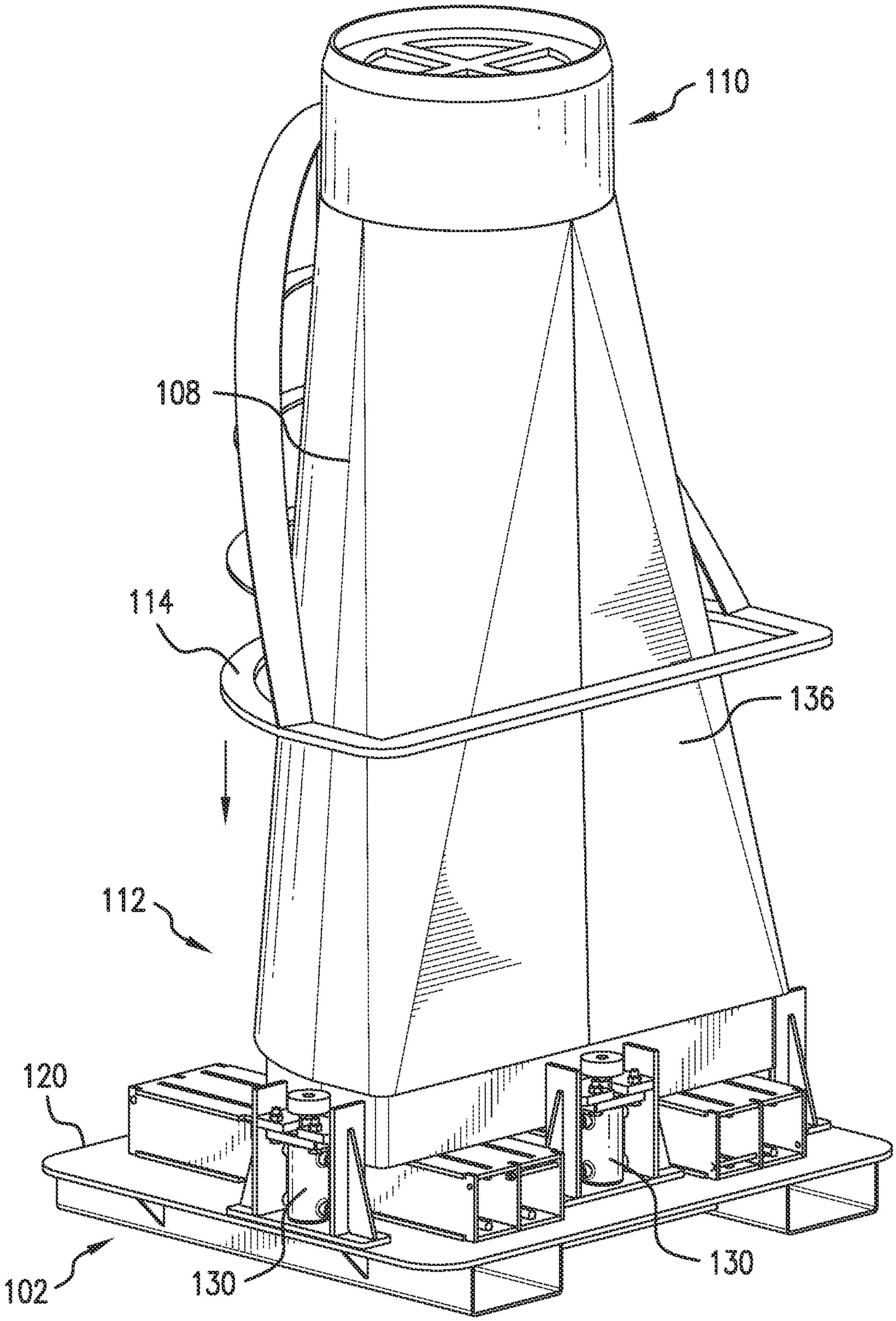
FIG. 6 illustrates the core positioned on the sub-base of FIG. 1 with the pallet being lowered into position where it can be attached to the actuator.

Turning to FIG. 6, illustrated is inner core 108 positioned on base assembly 102 with pallet 114 being slid downward thereon into position before it is bolted to actuators 130. Once pallet 114 is attached, it remains attached throughout the manufacturing process and need only be removed for maintenance or cleaning. Inner core 108 functions as the inner mold for flared product 200. Inner core has first end 110 and throat end 112 with throat end having a wider diameter to provide the flared-end opening for flared product 200. In this regard, inner core tapers outward from first end 110 to throat end 112. In the illustrated embodiment, a flat surface 136 to inner core is provided. In some situations, it is desirable to have flared product 200 with a flat bottom; however, this shape is not required. Inner core 108 can be any shape including cylindrical, arch, elliptical, box, rectangular, etc.

An important feature evident from the figures is that inner core 108 is positioned with throat end 112 downward. This is an important feature of this disclosure. By casting flared product 200 with its throat end down, flared product 200 can be easily lifted upward off base assembly 102 and inner core 108 by a hoist, moved out of the way of assembly 100, and easily laid down. This is very different than the way of casting flared end products have been done in the past which required careful lifting of the product upward while not putting too much pressure on the throat end and then maneuvering it around being careful not to break the product. The ease at which flared end product 200 can be lifted off of and maneuvered away from assembly 100 greatly increase the speed of production and reduces the risk of damage to flared end product 200.

Figure 7:
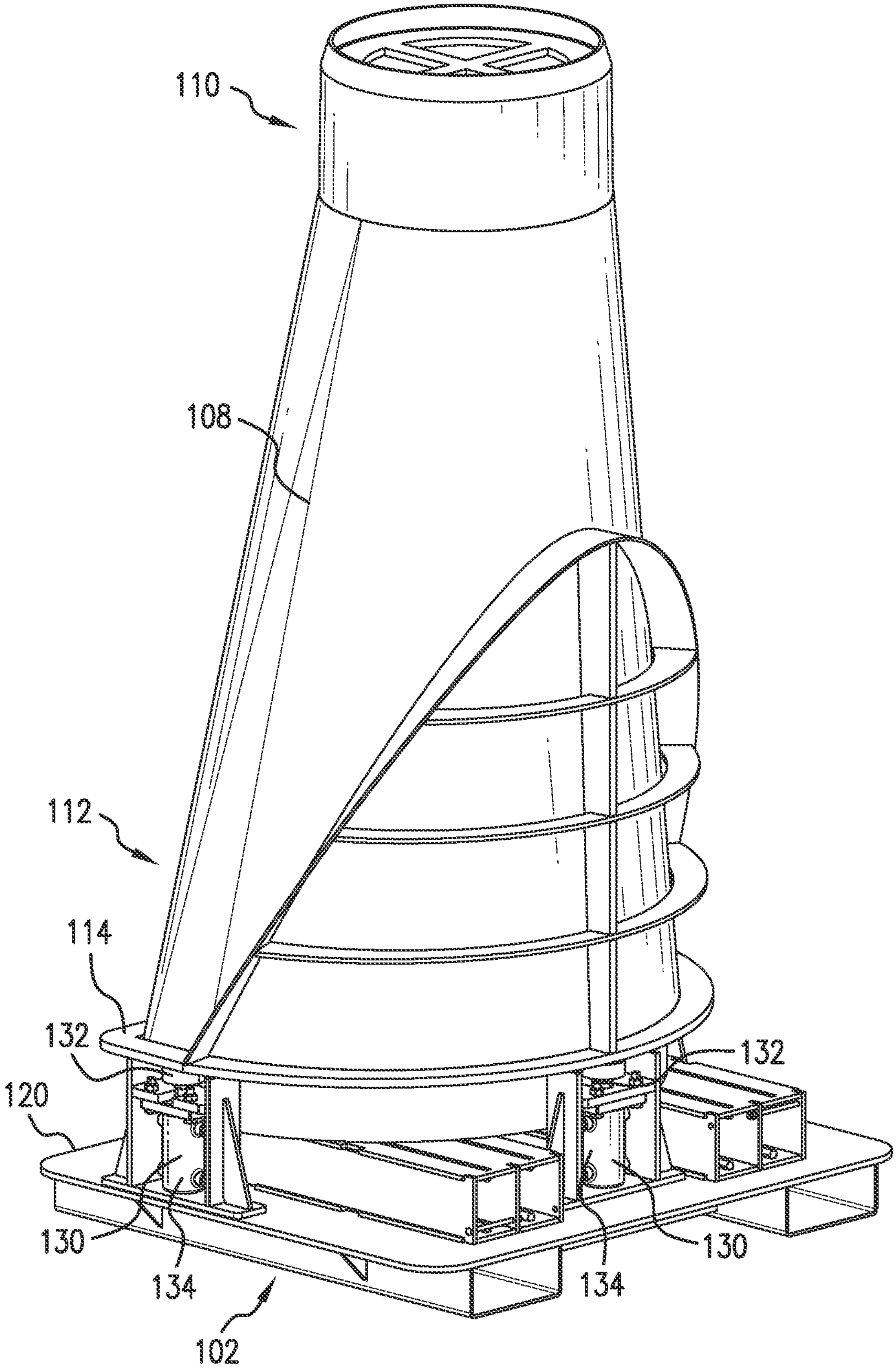
FIG. 7 illustrates the pallet on the core in advance of wet casting.
Figure 8:
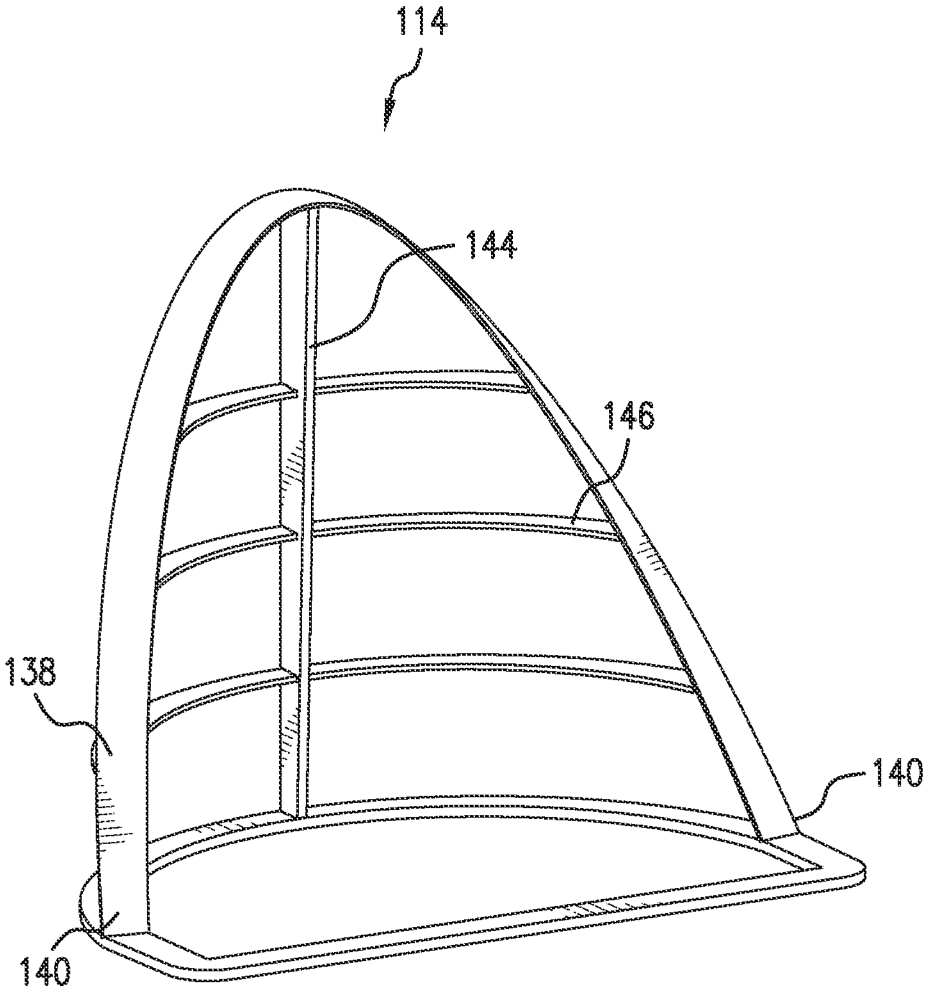
FIG. 8 illustrates the pallet.

FIGS. 6-7, illustrate pallet 114 positioned on inner core 108. FIG. 8 illustrates pallet 114 by itself. Pallet 114 comprises of a flared-end former 138 bent around an axis and having two ends 140. Flared-end former 138 can be elliptical, oval, or any other shape that would give the flared end of flared end product 200 its desired shape. Each of two ends 140 of flared-end former 138 are welded or otherwise fixed to a plate 142 having the desired cross-sectional profile of flared end product 200. In the illustrated embodiment, plate 142 is a round or elliptical shape with flat bottom but the plate can have any desired shape. Flared-end former 138 is positioned upright with respect to plate 142 and braced in the upright position by a vertical extending member 144 and held firmly, laterally by a plurality of reinforcing ribs 146. As can be seen by comparing FIG. 6 with FIG. 7, pallet 114 is slid onto inner core 108 to rest around throat end 112, which can also be seen in FIG. 2. Again, once pallet 114 is in position and attached to pallet 114, it remains and need only be removed for cleaning or maintenance.

Figure 3:
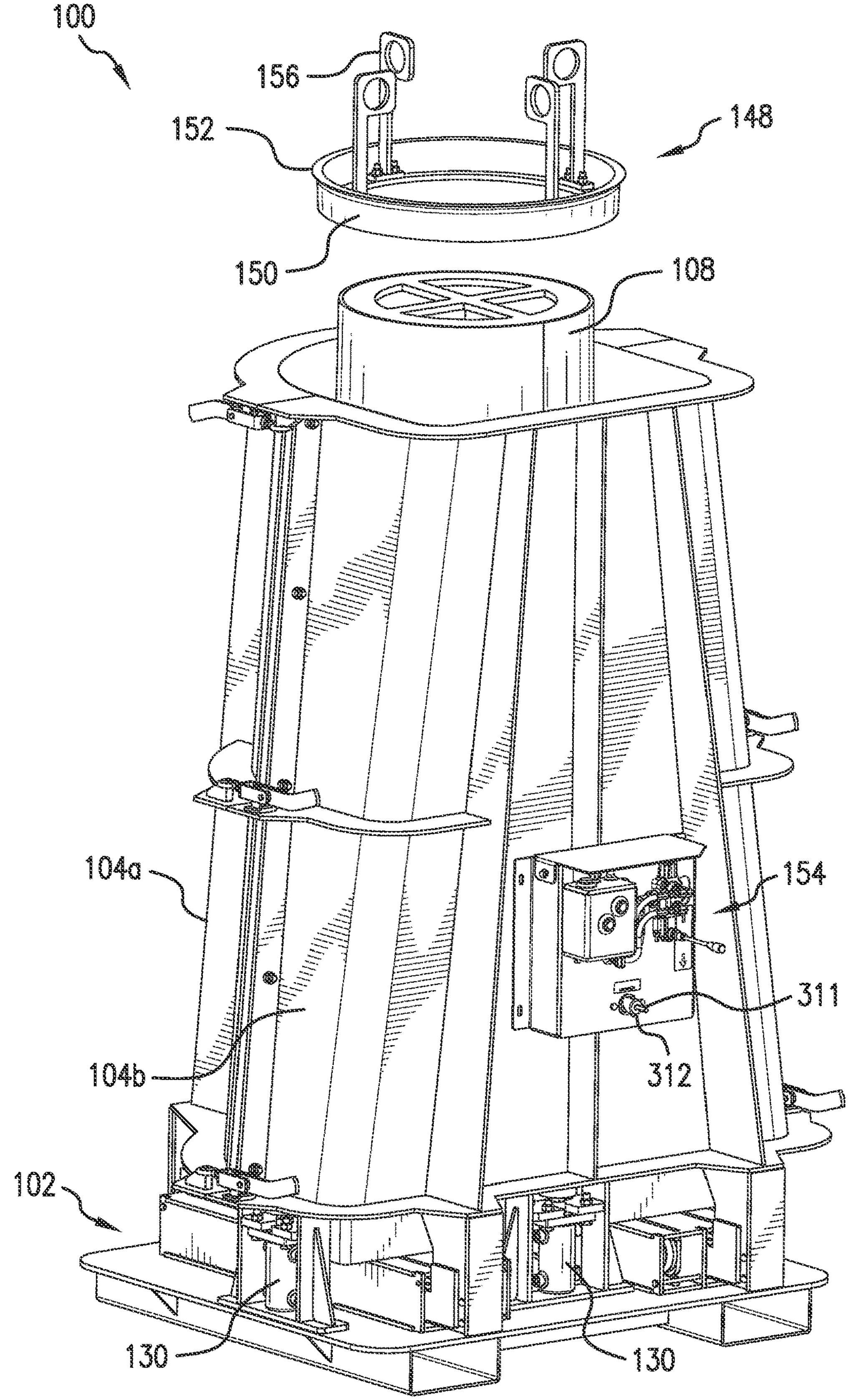
FIG. 3 illustrates the assembly of FIG. 1 with the doors closed and the end-former being lowered in position in preparation for wet casting.

Turning to FIG. 3, after pallet 114 is positioned on inner core 108 and pair of doors 104 are closed and locked, there remains an opening at the top into which concrete slurry is poured into cavity 116. Prior to this, however, an end-former 148 is set into position. End-former gives flared product 200 its desired end shape for connecting flared product 200 to a concrete pipe. In this regard, end-former 148 can be configured to provide a tongue or groove shape depending on the type of pipe it needs to be joined to. End-former 148 comprises of a circular plate 150 with a lip 152 formed at the top of plate 150 to allow end-former 148 to rest on top of the opening to cavity 116 on top of pair of doors 104. There remains a sufficient opening to cavity 116 into which concrete slurry is poured. End-former 148 also comprises a plurality of lift members 156 to allow for easy removal of end-former 148 after production.

Figure 4:
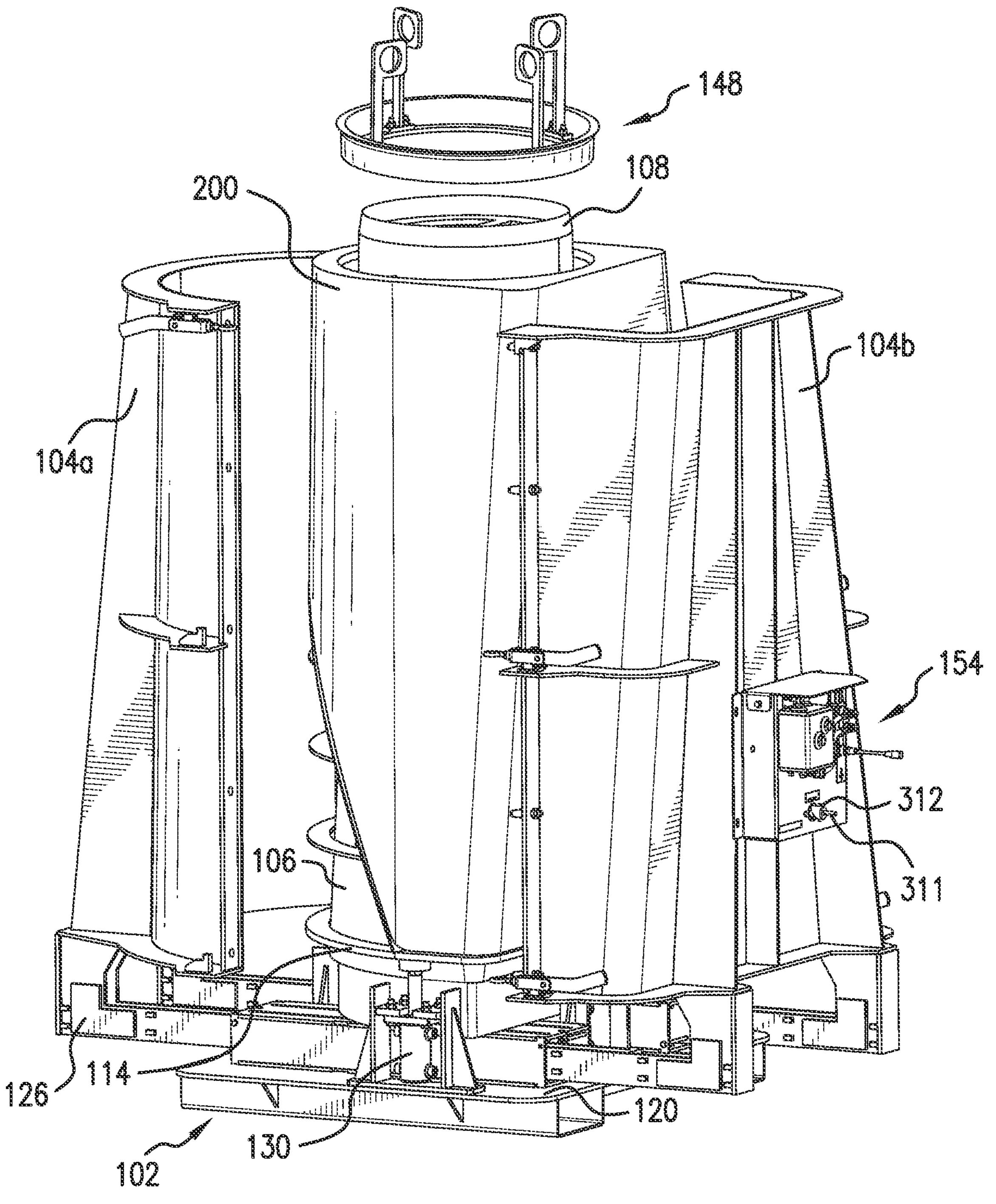
FIG. 4 illustrates the assembly of FIG. 3 following wet casting with the doors rolled open and the end-former removed.

In operation, the process of manufacturing flared end product 200 begins with FIG. 2 with pair of doors 104 being opened and pallet 114 being placed onto inner core 108 (as shown in FIG. 6). Pair of doors 104 are then shut and locked, as shown in FIG. 3, followed by placing end-form over the opening to cavity 116. Afterwards, concrete slurry is poured through the top opening and into cavity 116. The concrete is allowed to set for the required period of time. Thereafter, pair of doors 104 are opened as shown in FIG. 4 with flared product 200 vertically cast in the upright position with its throat end facing downward on pallet 114.

Figure 5:
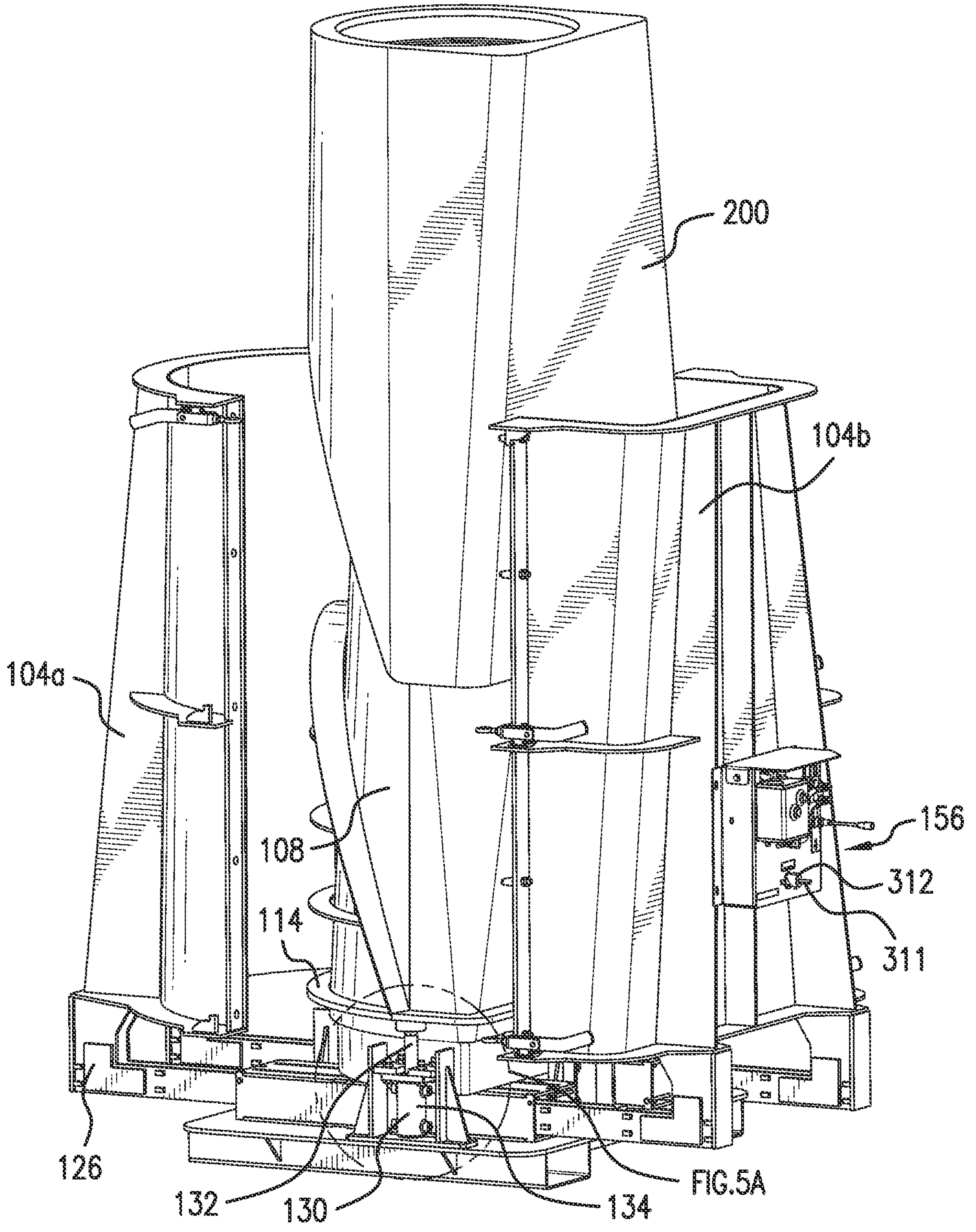
FIG. 5 illustrates the assembly of FIG. 4 with the flared end product being removed from the form.
Figure 5A:
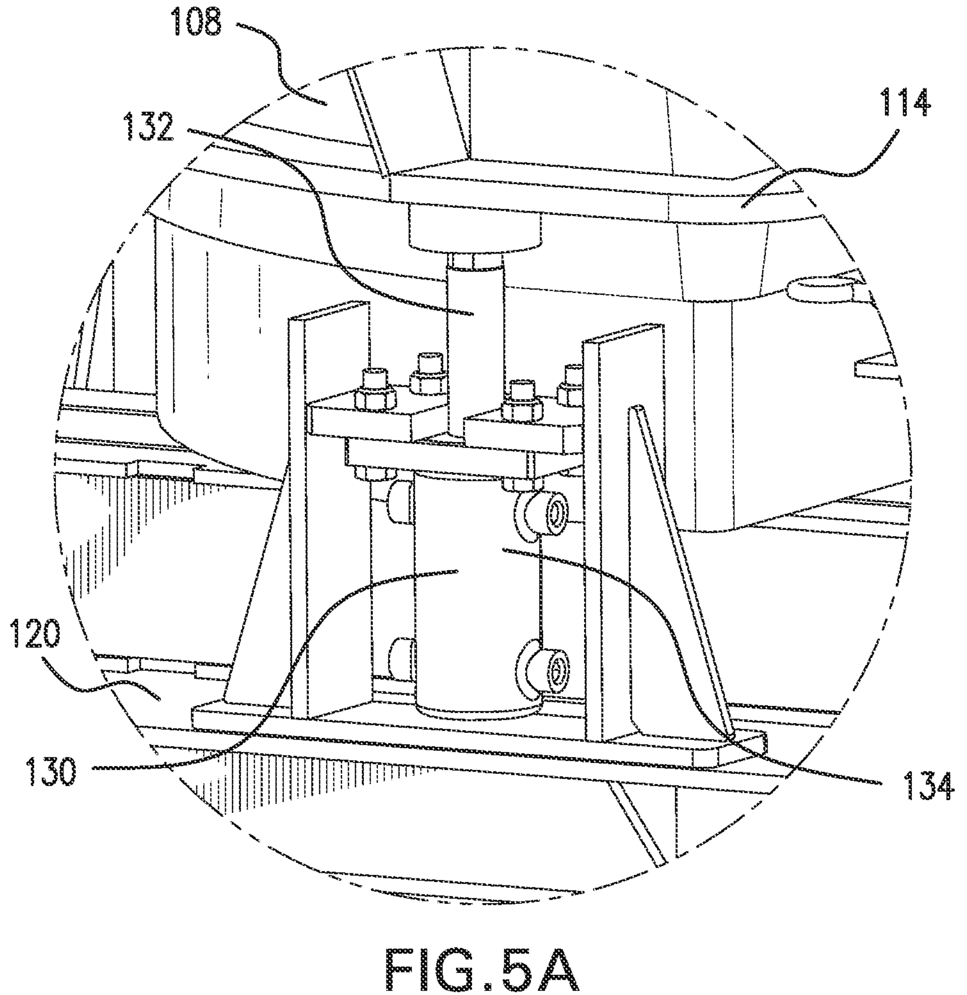
FIG. 5A is a close-up view of area A illustrating an actuator breaking the bond between the core and the flared-end product with an upward thrust on the pallet.

Turning to FIG. 5, shown is flared product 200 being removed from inner core 108. Prior to this, the concrete to core bond between inner core and flared product 200 must be broken. The bond is broken by actuators 130, as discussed above. More specifically, actuators 130 are operatively connected to an operating panel 154 to allow the operator to manually trigger rods 132 to push pallet 114 with flared product 200 sitting thereon upward with enough force to break the bond with flared product 200. Rods 132 need only travel one to six inches to break the bond.

Those skilled in the art will understand that actuators 130 can be implemented as any type of actuator, including electric, pneumatic, and hydraulic, with any number of actuators 130. The specific implementation of actuators 130 will define the operating system for the same. While any type of actuators 130 can be used, actuators 130 implemented with hydraulics are presently the preferred system.

Figure 9:
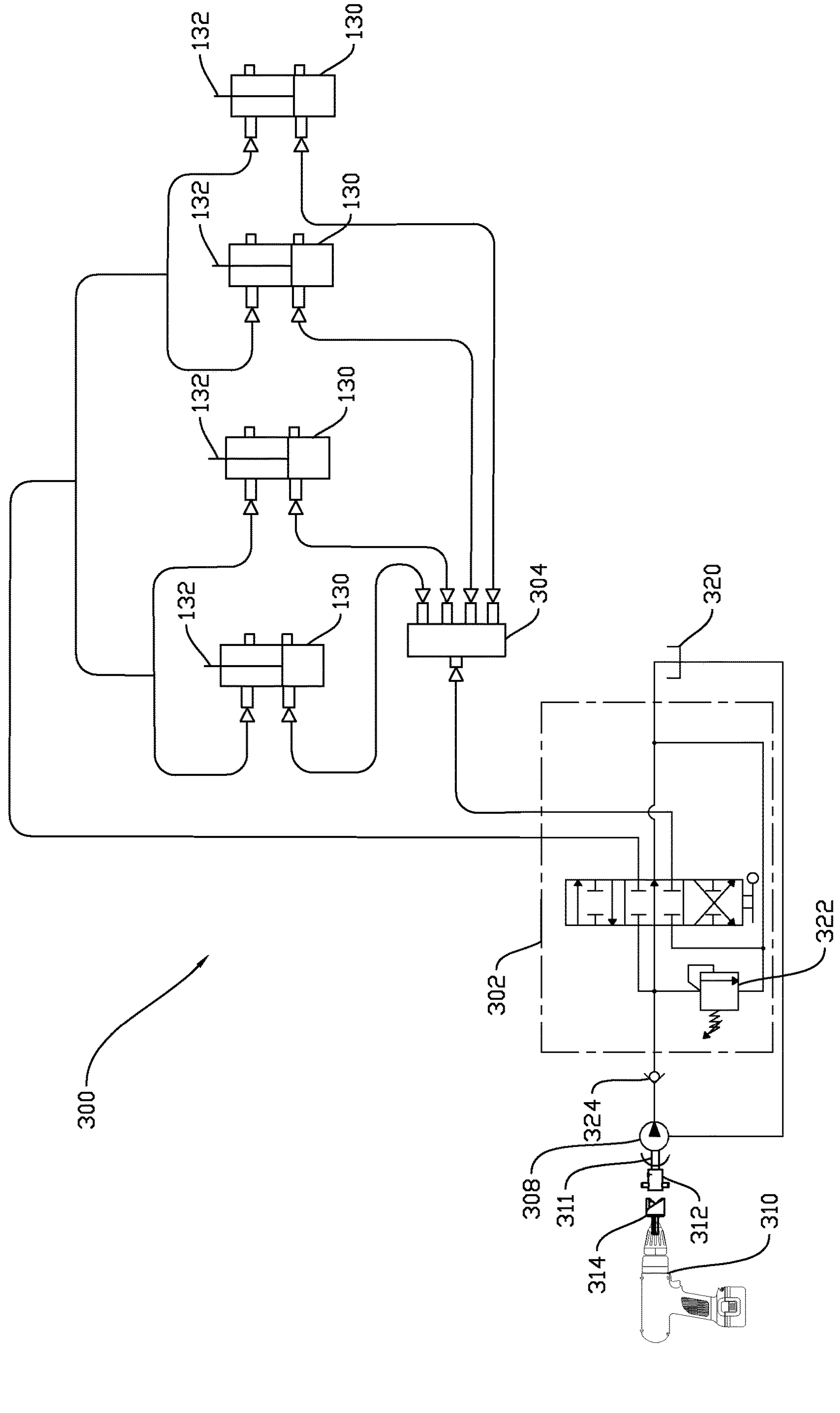
FIG. 9 a schematic for a hydraulic systems for breaking the bond between an inner core and a flared-end product.

FIG. 9 shows a hydraulic schematic for a hydraulic system 300 for breaking the bond between inner core 108 and flared-end product 200. System 300 comprises of a rotary driven power source 308 that converts rotary motion into hydraulic energy used to pressurize a plurality of actuators 130 each of which being connected in parallel. Once pressurized by rotary driven power source 308, actuators 130 break the bond between inner core 108 and flared-end product 200 by pressing pallet 114 upward with sufficient pressure to break the bond. As previously described, pallet 114 is slid on top of inner core 308 and attached to the respective pistons of actuators 130. This allows actuators 130 to press pallet 114 upward for relative movement with respect to inner core 108. With flared-end product 200 cast on top of pallet 114 and surrounding inner core 108, actuators 130 can press pallet 114 upward with sufficient pressure to break the bond between inner core 108 and flared-end product 200.

More specifically, each of plurality of actuators 130 are connected to a directional control valve 302 for directing hydraulic fluid to either the rod side for inward movement or the bottom side for outward movement. For outward movement of rod 132, hydraulic fluid is directed from directional control valve 302 to flow divider 304 to ensure equal flow of hydraulic fluid to each of actuators 130 for consistent and equal movement of rod 132 against pallet 114. For the return stroke of rod 132, hydraulic fluid can simply be redirected through directional control valve 302 to reservoir 320. System 300 is protected from over pressure by a relief valve 322. If the pressure inside system 300 exceeds a predetermined amount, relief valve is automatically opened to dump hydraulic fluid into reservoir 320 and relieve pressure. System 300 can also include a check valve 324 to protect rotary driven power source 308 from back flow.

In an embodiment, rotary driven power source 308 is operated manually by a rotary power tool 310. Rotary power tool 310 can be a cordless drill or any other type of rotary power tool 310 that can apply rotary motion to drive rotary driven power source 308. Rotary power tool 310 is attachable to a transmission shaft 311 of rotary driven power source 308 for rotating transmission shaft 311 and operating rotary driven power source 308. A first adapter 314 can be combinable to rotary power tool 310 and a second adapter 312 can be combinable to transmission shaft 311 of rotary driven power source 308 for providing one-way rotation of transmission shaft 311 of rotary driven power source 308 to protect rotary driven power source 308 from being driven in the wrong direction. The details of the respective first adapter 314 and second adapter 312 are shown and more thoroughly described in U.S. Pat. No. 11,628,594 titled, Hydraulic System for Stripping Concrete Forms, the entirety of which is hereby incorporated by reference herein.

It should also be stated that if desirable, another set of actuators can be combined to pair of doors 104 as shown in commonly owned, U.S. Pat. No. 11,628,594. As applied to the instant disclosure, the system can use hydraulics to break the bond between pair of doors 104 and flared-end product 200. The same or similar hydraulic system 300 as shown herein can be used, but instead of actuators 130 pressing against pallet 114, they are attached to one door and press against the other or a combination of being oppositely oriented with two actuators attached to one of pair of doors 104 and pressing against the other and two of the other actuators 130 attached to the opposite door and pressing against the other.

As stated above, the foregoing vertical wet cast form assembly 100 for wet-cast manufacturing flared end products 200 has several advantage over the prior art method of horizontally wet casting flared end products or vertically dry-casting flared end products. The wet cast method for manufacturing products is a simpler manufacturing method as concrete slurry merely needs to be poured into the cast and set. The dry cast method, however, requires vibration machinery to pack the concrete slurry in the cast. By vertically casting the flared end product, the finished products can be stripped and removed from the form quicker, easier, and with less risk of damage than a horizontal form.

Assembly 100, herein described is cast with the throat down which allows flared products 200 to be easily lifted off assembly 100 and laid down with minimal risk of damage. Because end-former 148 is place on the top of inner core 108, it can be easily set in position. With horizontal forming great care is required to properly align the end former so that is even with a vertical plane perpendicular to a horizontally positioned inner core. Finally, hydraulic cylinders 130 allow for quick and easy breaking of the bond between inner core 108 and flared product 200. All of these advantages lied to an improved manufacturing process that increase efficiency and reduces the amount of damaged products.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A vertical wet cast form assembly for manufacturing a concrete product with a flared end, the assembly comprising:

a base assembly;

a pair of doors slidingly attached to the base assembly for moving between an open position and a closed position;

an inner core comprising a first end and a throat end with the throat end having a larger diameter than the first end, wherein the throat end is positioned downward on top of the base assembly with the first end in an upright position; and a pallet positioned around the throat end of the inner core, the pallet comprising a flared-end former having two ends and a plate attached at to the two ends of the flared-end former;

wherein, when the pair of doors are in the closed position a cavity is formed that is open from the top of the pair of doors and is located between the inner core and the pair of doors and corresponds to the shape of the concrete product with the flared end.

2. The assembly of claim 1, wherein the pallet further comprises a plurality of reinforcing ribs extending between the flared-end former.

3. The assembly of claim 2, wherein the pallet further comprises a reinforcing member extending upright between the plate and the flared-end former.

4. The assembly of claim 3, wherein the flare-end former is bent around an axis to provide an open-end shape of the concrete product.

5. The assembly of claim 1, and further comprising an actuator attached at one end to the base and attached at another end to the pallet for pushing the pallet upward to break the bond between the inner core and the concrete product with the flared end.

6. The assembly of claim 1, and further comprising an end-former positionable on the pair of doors when in the closed position.

7. A vertical wet cast form assembly for manufacturing a concrete product, the assembly comprising:

a base assembly;

a pair of doors slidingly attached to the base assembly for moving between an open position and a closed position;

an inner core positioned in a vertically upright position;

a pallet positioned around the throat end of the inner core, the pallet comprising a flared-end former having two ends and a plate attached at to the two ends of the flared-end former; and an actuator attached at one end to the base and attached at another end to the pallet for pushing the pallet upward to break the bond between the inner core and the concrete product;

wherein, when the pair of doors are in the closed position a cavity is formed that is open from the top of the pair of doors and is located between the inner core and the pair of doors and corresponds to the shape of the concrete product in an upright position.

8. The assembly of claim 7, wherein the inner core further comprises a first end and a throat end with the throat end having a larger diameter than the first end, wherein the throat end is positioned downward on top of the base assembly with the first end in an upright position.

9. The assembly of claim 7, wherein the pallet further comprises a plurality of reinforcing ribs extending between the flared-end former.

10. The assembly of claim 9, wherein the pallet further comprises a reinforcing member extending upright between the plate and the flared-end former.

11. The assembly of claim 10, wherein the flare-end former is bent around an axis to provide an open-end shape of the concrete product.

12. The assembly of claim 7, and further comprising an end-former positionable on the pair of doors when in the closed position.

13. A method of vertical wet casting a concrete product with a flared end in an upright position, the method comprising:

providing a base assembly;

providing an inner core comprising a first end and a throat end with the throat end having a larger diameter than the first end and with the throat end positioned downward with the first end in an upright position;

providing a pallet positioned around the throat end of the inner core, the pallet comprising a flared-end former having two ends and a plate attached at to the two ends of the flared-end former;

providing a pair of doors slidingly attached to the base assembly for moving between an open position and a closed position;

closing the pair of doors;

positioning an end-former on the pair of doors when in the closed position;

filling a cavity with concrete slurry; and allowing the concrete slurry to partially solidify.

14. The method of claim 13, further comprising removing the end-former and opening the pair of doors.

15. The method of claim 14, further comprising pushing the pallet upward with respect to the inner core and breaking the bond between the inner core and the concrete product.

16. The method of claim 15, and further comprising lifting the concrete product vertically upward with respect to the inner core and laying the concrete product on its side to finish curing.

* * * * *